United States Patent
Pickett

(10) Patent No.: US 8,265,785 B2
(45) Date of Patent: Sep. 11, 2012

(54) EXTERNAL LOAD PORT MAGAZINE AND STORAGE SYSTEM AND METHOD OF USING SAME

(75) Inventor: Seth Pickett, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1354 days.

(21) Appl. No.: 11/697,193

(22) Filed: Apr. 5, 2007

(65) Prior Publication Data

US 2008/0247279 A1    Oct. 9, 2008

(51) Int. Cl.
 *G06F 7/00* (2006.01)
(52) U.S. Cl. ........................................... 700/214
(58) Field of Classification Search ................... 700/214, 700/213
See application file for complete search history.

(56) References Cited

U.S. PATENT DOCUMENTS

| | | | |
|---|---|---|---|
| 5,818,723 A * | 10/1998 | Dimitri ......................... | 700/214 |
| 5,898,593 A * | 4/1999 | Baca et al. .................... | 700/214 |
| 5,959,866 A * | 9/1999 | Hanaoka et al. ............... | 700/214 |
| 6,250,550 B1 * | 6/2001 | Winarski et al. ............... | 235/383 |
| 6,580,582 B1 | 6/2003 | Caverly | |
| 6,711,459 B1 * | 3/2004 | Sanchez Gomez ........... | 700/214 |
| 7,085,097 B2 * | 8/2006 | Starr et al. .................... | 360/92.1 |
| 7,111,781 B2 | 9/2006 | Fletcher | |
| 7,626,895 B2 * | 12/2009 | Goodman et al. .......... | 369/30.65 |
| 2003/0075051 A1 * | 4/2003 | Watanabe et al. ............... | 99/325 |
| 2004/0240097 A1 * | 12/2004 | Evans ............................. | 360/69 |
| 2004/0254647 A1 | 12/2004 | Johnson | |
| 2005/0004703 A1 | 1/2005 | Christie, Jr. | |
| 2005/0157605 A1 * | 7/2005 | Lilland et al. ............... | 369/30.36 |
| 2005/0261800 A1 * | 11/2005 | Goodman et al. ............ | 700/214 |

* cited by examiner

*Primary Examiner* — Ramya Burgess

(57) ABSTRACT

An external load port magazine for use with a storage unit includes a casing detachably mountable on an exterior of the storage unit and defining therein a space for holding at least one item to be loaded into the storage unit. An opening is formed in the casing for enabling automatic withdrawal or insertion of the at least one item from or into the space when the casing is mounted on the exterior of the storage unit. A mechanism is provided for moving the at least one stored item towards the opening.

25 Claims, 6 Drawing Sheets

EXTERNAL LOAD PORT MAGAZINE AND STORAGE SYSTEM AND METHOD OF USING SAME

TECHNICAL FIELD

The disclosure relates to an external load port magazine for use with a storage unit, and a method of using the same.

BACKGROUND

Magnetic disks, optical disks and magnetic tape cartridges have been all widely used as peripheral digital data storage devices for computer systems. Large computer systems are usually connected with external libraries of multiple such digital data storage devices. Originally, digital data storage devices, such as tape cartridges, were loaded manually. Automated libraries were subsequently developed to expedite the handling of the tape cartridges. Such automated libraries include robotic pickers for accessing, transferring and loading a desired tape cartridge into a reader/writer, and hold the tape cartridges in magazines. Each magazine may hold several tape cartridges in respective slots. Once the library has been up and running, there will be a need to add/remove tape cartridges to/from the library.

In accordance with a prior approach, a magazine is loaded with tape cartridges outside the library, and then the magazine is inserted into the library as a unit and, similarly, removed as a unit. In accordance with another approach, tape cartridges can be inserted individually into the library via a mail-slot.

A further approach is to provide the library with load port specific hardware built into the library. The slots in such load port specific hardware can be configured either as load port slots for adding or removing tape cartridges or as regular storage slots. This arrangement creates a tradeoff between having more load port slots or more storage slots. Also, the built in load ports require different hardware than normal storage slots, because the load port slots need to be accessible by the user while the library is active, and because the load port magazines usually need to be removable. Another problem with built in load ports is that it is difficult to predict how many load port slots a customer may require. In addition, with the built in hardware it is difficult to provide enough flexibility, because the choices of the customer are limited to a range inside the predefined number of configurable load port slots the vendor picks.

Another attempt at making the load port more flexible is to allow each row of slots to be configured as load ports which provides some flexibility in the number of load port slots. Still, this approach causes a trade off between the number of storage slots and the number of load port slots.

SUMMARY

In an aspect, an external load port magazine for use with a storage unit comprises a casing detachably mountable on an exterior of the storage unit and defining therein a space for holding at least one item to be loaded into the storage unit. An opening is formed in the casing for enabling automatic withdrawal or insertion of the at least one item from or into the space when the casing is mounted on the exterior of the storage unit. A mechanism is provided for moving the at least one stored item towards the opening.

In a further aspect, a storage system comprises a storage unit for storing a plurality of items, and at least an external load port magazine detachably mountable on an exterior of the storage unit for loading and unloading at least one item into and from the storage unit. The storage unit comprises a housing having therein a plurality of locations each capable of receiving and storing one of the items, and at least a receiving slot extending through a wall of the housing. The external load port magazine comprises a casing detachably mountable on the exterior of the housing and defining therein a space for holding the at least one item, and an opening in the casing to be aligned with the receiving slot when the casing is mounted on the exterior of the housing for enabling automatic transfer of the at least one item, one at a time, from the space into the housing and vice versa through the aligned opening and receiving slot.

In a further aspect, a method of bulk loading and unloading of digital data storage devices to and from a digital data storage device library having therein a plurality of storage locations each being capable of receiving and storing one of the digital data storage devices, comprises: detachably mounting an external load port magazine to an exterior of the library so that an opening of the external load port magazine is aligned with a corresponding receiving slot of the library to define a passage between an interior of the external load port magazine and the storage locations within the library; and automatically transferring one or more of the digital data storage devices, one at a time, through the passage.

In a further aspect, a storage unit for storing a plurality of items, comprises a housing having an internal space in which a plurality of locations each capable of receiving and storing one of the items are arranged. The housing is configured for allowing at least an external load port magazine to be detachably mountable on an exterior thereof. At least a receiving slot extends through a wall of said housing and is alignable with an opening of the external load port magazine, when the external load port magazine is mounted on the housing, for transfer of at least one of the items between the external load port magazine and the internal space of the storage unit. The storage unit further comprises a robotic picker for gripping and moving said at least one of the items through said receiving slot for transferring said at least one of the items between the internal space of the storage unit and the external load port magazine when the external load port magazine is mounted on the exterior of the storage unit.

Additional aspects and advantages of the disclosed embodiments are set forth in part in the description which follows, and in part are obvious from the description, or may be learned by practice of the disclosed embodiments. The aspects and advantages of the disclosed embodiments may also be realized and attained by the means of the instrumentalities and combinations particularly pointed out in the appended claims.

BRIEF DESCRIPTION OF THE DRAWINGS

The disclosed embodiments are illustrated by way of example, and not by limitation, in the figures of the accompanying drawings, wherein elements having the same reference numeral designations represent like elements throughout.

DETAILED DESCRIPTION OF EMBODIMENTS

Figure 1:
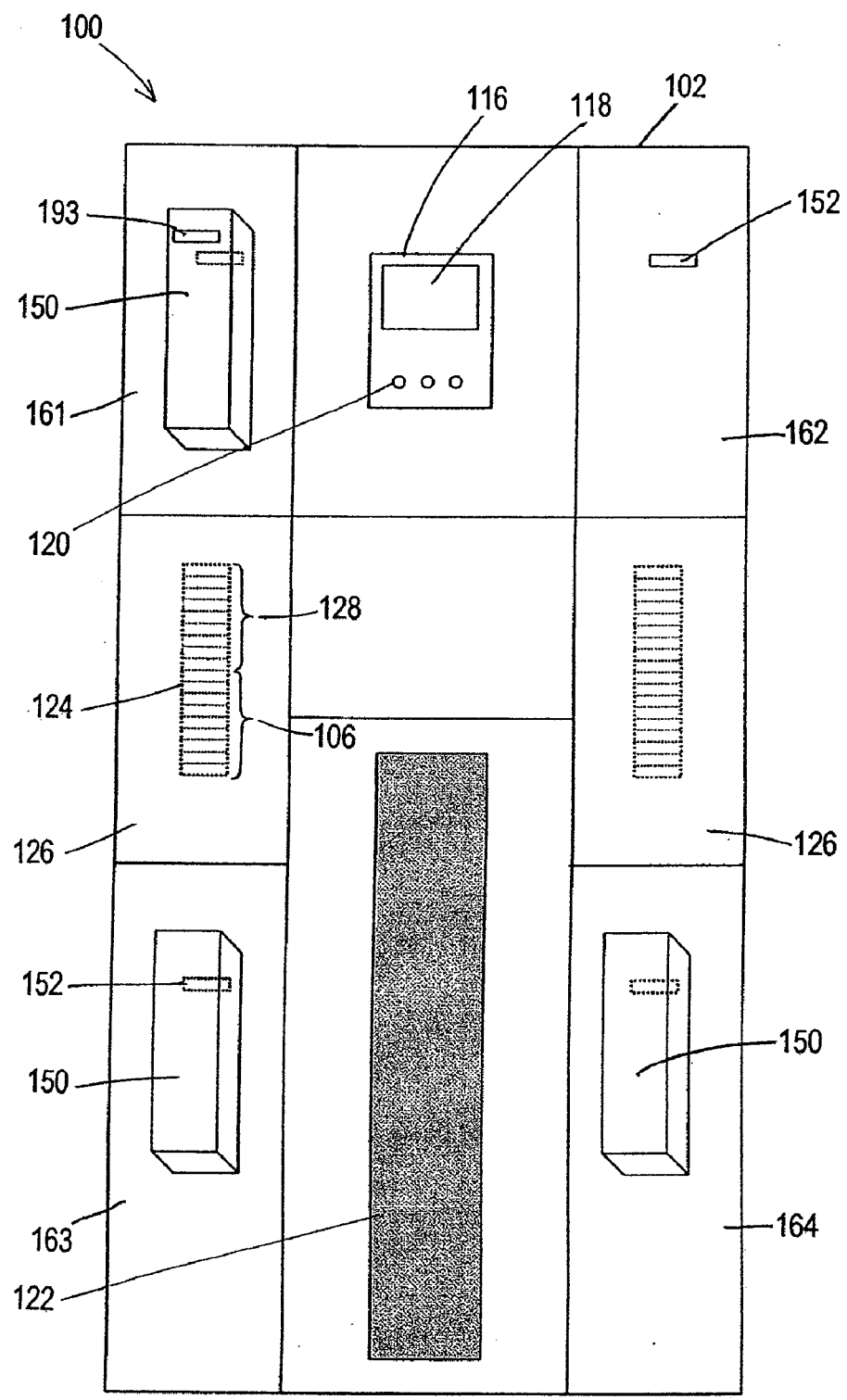
FIG. 1 is a schematic front view of a library configured for use with one or more external load port magazines in accordance with an embodiment.

In the following detailed description, for purposes of explanation, numerous specific details are set forth in order to provide a thorough understanding of the embodiments. It will be apparent, however, that the embodiments may be practiced without these specific details. In other instances, well-known structures and devices are schematically shown in order to simplify the drawing.

Figure 2:
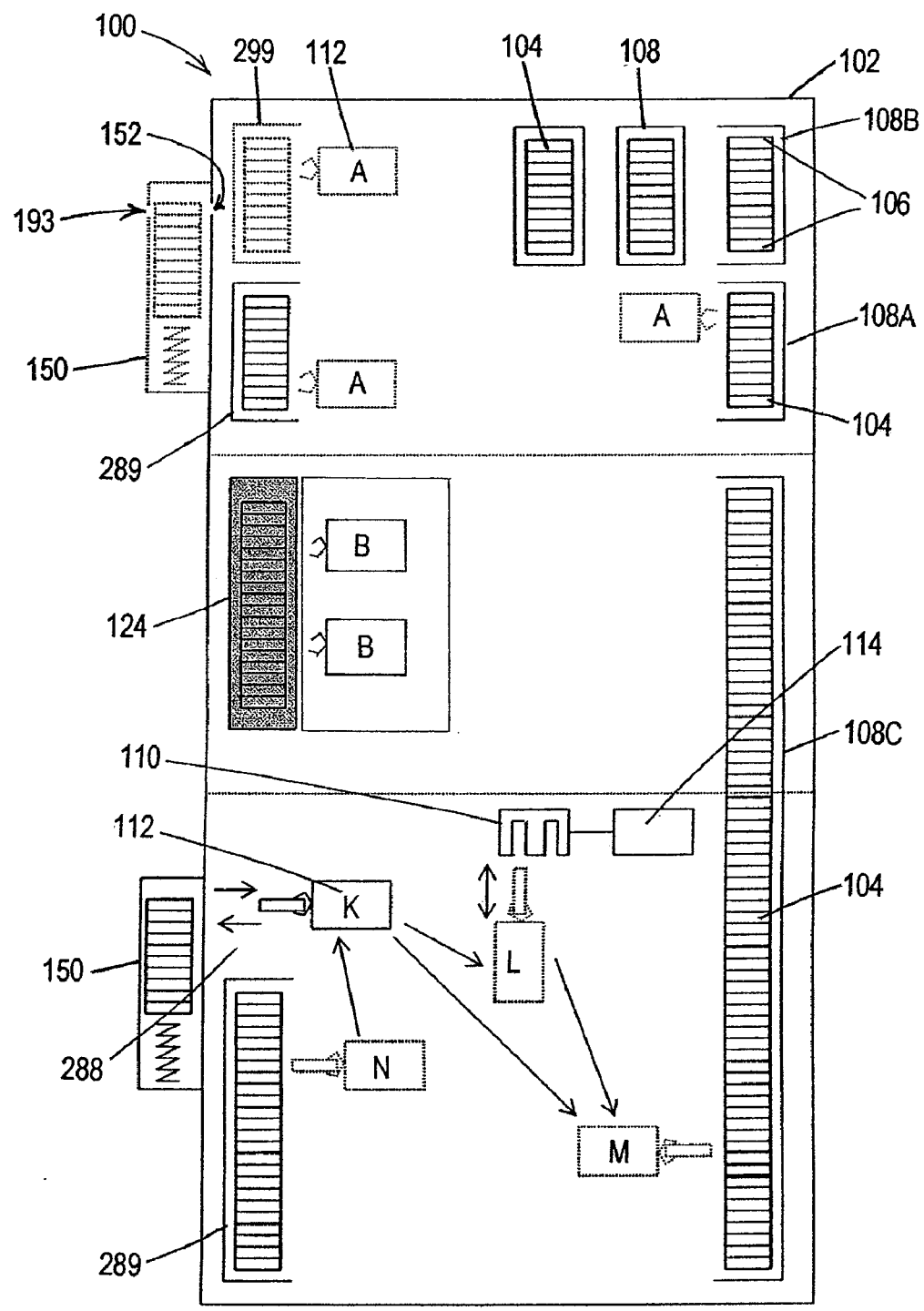
FIG. 2 is a schematic, cut-away side view showing the interior of the library and external load port magazine of FIG. 1.

FIG. 1 is a schematic front view of a library 100 configured for use with one or more external load port magazines 150 in accordance with an embodiment FIG. 2 is a schematic, cut-away side view showing the interior of library 100 and external load port magazine(s) 150 of FIG. 1. The following description will be given with reference to both FIGS. 1 and 2.

In particular, library 100 includes a housing 102 defining an internal space for storing one or more digital data storage devices 104. Digital data storage devices 104 can be stored in individual storage locations or cells 106 of one or more magazines 108. Library 100 further includes a reader/writer 110 for reading and/or writing the contents of digital data storage devices 104 and a robotic picker 112 for transferring digital data storage devices 104 between cells 106 and reader/writer 110. A controller 114 is also provided for processing data read/written by reader/writer 110 and/or controlling operation of robotic picker 112 and/or handling communication between library 100 and external equipment such as a host computer (not shown).

It is within the scope of the present invention to provide various configurations for library 100. For example, library 100 may include any number of reader/writers 110 and magazines 108 depending on the storage desired and the sophistication of data processing. Library 100 may, alternatively, include only magazines 108 and no reader/writer 110. Further, magazines 108 may be of the modular type which can be stacked one upon another as designated at 108A and 108B, thereby providing some flexibility in configuring the storage capability of library 100 as the modular type magazines 108 can be easily added to or removed from library 100 to meet a particular user need. Additionally or alternatively, magazines 108 can be of the built-in type or include mounting brackets, as designated at 108C, which has a fixed configuration and, generally, provides more storage space but is less flexible than the modular type magazines 108A-B.

In an embodiment, library 100 includes one or more robotic pickers 112 which travel(s), e.g., along a track (not shown), for carrying digital data storage devices 104 between magazines 108 and reader/writer 110, if provided. Robotic picker 112 is configured to be able to insert and withdraw digital data storage devices 104 from either cells 106 of magazines 108 or reader/writer 110. In a further embodiment, robotic picker 112 is moveable in any necessary manner, e.g., linearly and/or rotationally, under control of controller 114. In another embodiment, control of library operation including operation of reader/writer 110 and/or robotic picker 112 can be performed via external equipment, such as a host computer (not shown). In the description herein below, control performed by library 100 should be understood to be performed by controller 114 or a host computer or combinations or equivalents thereof.

Further embodiments provide library 100 with an user interface 116 for allowing an operator to control some or all aspects of library operation. As schematically shown in FIG. 1, user interface 116 includes a screen 118, e.g., a liquid crystal display (LCD) screen, and control buttons 120. Regular computer monitors and input devices, such as mice, keyboards, styluses, touch screens etc. can also be used as user interface 116. Reference numeral 122 in FIG. 1 designates an optional see-through window that gives the operator a direct view of the interior of library 100 without opening a wall of housing 102, and/or ventilation holes.

It will be appreciated that library 100 allows for placing digital data storage devices 104 into the library and removing digital data storage devices 104 from the library when a user so desires. In one embodiment, library 100 may include one or more mail-slots (not shown) or magazine slots (not shown) to allow individual digital data storage devices 104 and/or magazines 108 to be remove from or placed to library 100. Examples of such mail-slots and magazine slots are provided in U.S. Patent Application Publication No. 2005/0004703 which is incorporated by reference herein in its entirety.

One or more internal load port magazines 124 can be also be used in accordance with another embodiment. Internal load port magazine 124 can be configured as a drawer as schematically shown in FIG. 1 at panels 126. Like magazines 108, internal load port magazine 124 also has slots 106 for holding digital data storage devices 104. However, one or more or all of slots of internal load port magazine 124 are configured (hardware) and/or defined (software) by the manufacturer, operator or library 100 as load port slots 128 rather than regular storage slots 106. Internal load port magazine 124 is normally retracted within library 100 as the name "internal" suggests. Internal load port magazine 124 slides out for loading load port slots 128 with digital data storage devices 104, and is then retracted again within library 100 for unloading load port slots 128. Examples of such internal load port magazines are provided in U.S. Patent Application Publication No. 2004/0254647 which is incorporated by reference herein in its entirety.

As discussed above, internal load port magazines 124 require a tradeoff between having more load port slots 128 or more storage slots 106. In addition, load port slots 128 may require different hardware than normal storage slots 106 because load port slots 128 need to be accessible while the library is active, and because internal load port magazines 124 usually need to be removable. Another problem with built in or internal load port magazines 124 is that it is difficult to predict how many load port slots 128 and/or internal load port magazines 124 a customer may require, and with the built in hardware it is difficult to provide enough flexibility.

Disclosed embodiments of the present invention provide an external load port magazine 150 to solve one or more of the above and other problems. Specifically, library 100 may include one or more external load port magazines 150 in lieu of or in addition to one or more mail-slots, magazine slots, and internal load port magazines of the types disclosed above and/or other types.

Unlike internal load port magazine 124 which normally resides within library 100, external load port magazine 150 is always located outside library 100. In an embodiment, external load port magazine 150 is removably attached to the outer wall, e.g., the front panel, of housing 102 of library 100 by any appropriate means, for example, snap connectors schematically shown at 352 in FIG. 3A. External load port magazine 150 as illustrated in FIGS. 3A-3D further includes a casing 354 carrying connectors 352 and defining therein a space 356 for holding at least one digital data storage device 104 to be loaded into library 100.

Casing 354 further has an opening 358 through which the digital data storage devices 104 can be withdrawn from or inserted into space 356 of casing 354 when casing 354 is mounted on the exterior of housing 102 of library 100. For this purpose, the outer wall, e.g., the front panel, of housing 102 includes a matching receiving slot 152 (FIG. 1) which is adapted to be aligned with opening 358 when external load port magazine 150 is attached to library 100. In the specific embodiment illustrated in FIGS. 3A-3D, connectors 352 are arranged around opening 358 to releasably engage edges of receiving slot 152. In other embodiments, connectors 352 or any other attaching means engage housing 102 outside receiving slot 152.

Within space 356 of casing 354, there is further provided a mechanism 360 for moving and/or guiding digital data storage devices 104 towards and/or away from opening 358. Mechanism 360 can be mechanically and/or electrically and/or magnetically and/or pneumatically and/or gravity-driven or can have any suitable configuration. In the specific, exemplary embodiment of FIGS. 3A-3D, mechanism 360 includes a spring-loaded platform 364 and a spring 362 biasing platform 364 towards opening 358. A stop 366 is provided at or about the level of opening 358 for stopping the uppermost digital data storage device 104U at a desired position corresponding to opening 358 and receiving slot 152 and ready for removal by robotic picker 112.

Figure 3A:
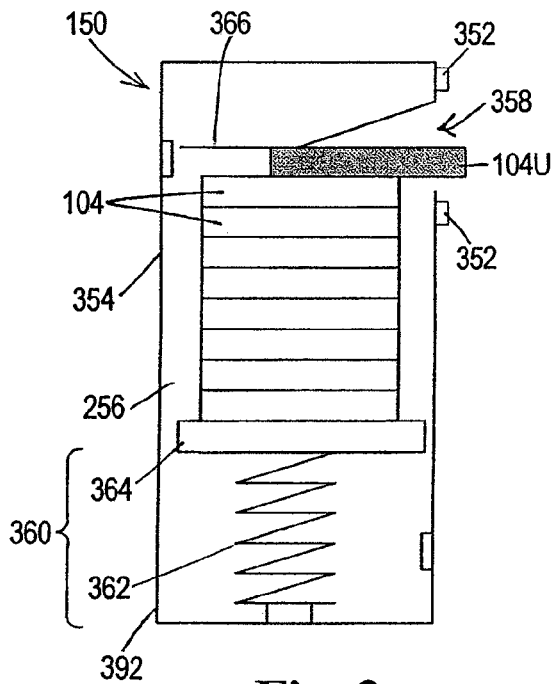
FIGS. 3A-3D are schematic, cut-away side views of an external load port magazine in accordance with an embodiment at various states.
Figure 3B:
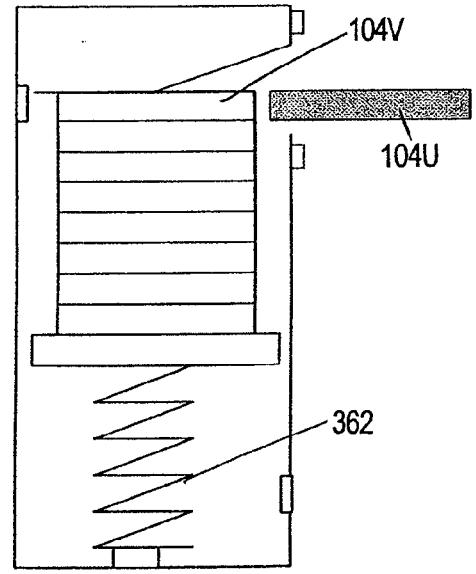

In FIG. 3A, the uppermost digital data storage device 104U is shown in the state of being withdrawn (or inserted) halfway by robotic picker 112 (not shown in FIG. 3A). After the uppermost digital data storage device 104U has been completely removed from the stack of digital data storage devices 104 as shown in FIG. 3B, the next digital data storage device 104V is pressed upwardly by spring 362 against stop 366 and becomes the uppermost digital data storage device ready to be picked up by robotic picker 112. The described unloading process is repeated until the last digital data storage device 104L (FIG. 3D) has been removed from external load port magazine 150 or until the unloading process is stopped by library 100 and/or the operator.

Figure 3C:
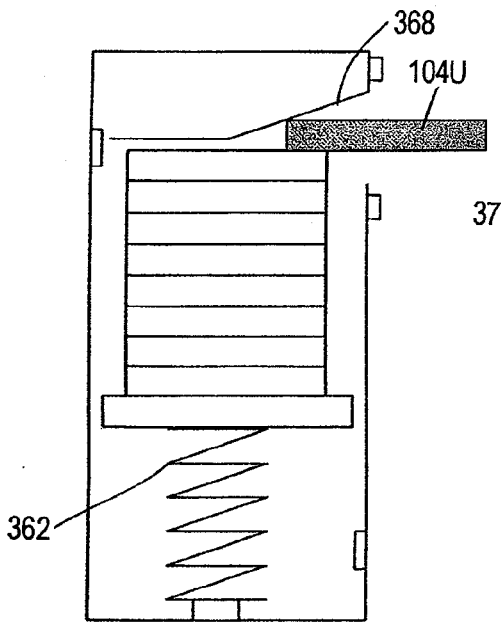

FIG. 3C illustrates digital data storage device 104U being inserted into opening 358 in a reversed, loading process. In particular, digital data storage device 104U is pushed by robotic picker 112 against a lead-in ramp 368 which is continuous to stop 366. Lead-in ramp 368 will guide digital data storage device 104U downwardly, thereby compressing spring 362 and moving the whole stack of digital data storage devices 104 already in external load port magazine 150 downwardly. When digital data storage device 104U has passed lead-in ramp 368 and reached the level of stop 366 as shown in FIG. 3A, further pushing by robotic picker 112 will move digital data storage device 104U, now the uppermost digital data storage device in the stack, horizontally until robotic picker 112 stops pushing and/or until the uppermost digital data storage device 104U hits a further stop (not shown) arranged for aligning digital data storage devices 104 properly within external load port magazine 150. The described loading process is repeated until external load port magazine 150 is full or until the loading process is stopped by library 100 and/or the operator.

Figure 3D:
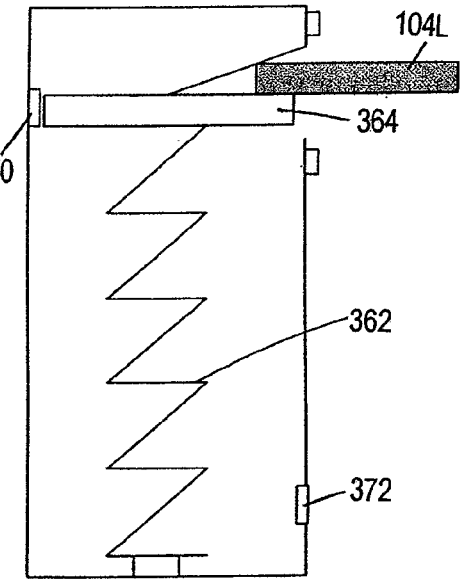

To notify library 100 and/or the operator that external load port magazine 150 is full or empty, one or more indicators are provided. For example, when external load port magazine 150 is empty as shown in FIG. 3D, platform 364 assumes a position at which it activates an empty indicator 370 which, in turn, notifies library 100 or the operator of the empty status of external load port magazine 150. In an embodiment, empty indicator 370 can be a sensor which transmits a signal corresponding to the empty status of external load port magazine 150 to any of library 100, robotic picker 112 and the operator. For example, empty indicator 370 may include a proximity (e.g., magnetic) or contact (e.g., electric) sensor. Then, the presence of platform 364 near the sensor or the contact of platform 364 with the sensor will trigger the sensor to send an electrical, or optical, or acoustic, or RF signal to library 100 which will notify the operator accordingly, either by ways of user interface 116 or other indicators (not shown) on the outer wall of housing 102 near the attached external load port magazine 150. Empty indicator 370 may also directly indicate the empty status on casing 354 of external load port magazine 150 itself.

In another embodiment, the presence of platform 364 near empty indicator 370 interrupts a communication between empty indicator 370 and robotic picker 112 or another component of library 100, thereby indicating the empty status of external load port magazine 150. For example, platform 364 may block a direct view between empty indicator 370 and robotic picker 112 when robotic picker 112 is in the position ready for picking up the next available digital data storage device 104. A light source, e.g., an LED, and an optical sensor can be provided in any or both of empty indicator 370 and robotic picker 112 to notify library 100 that the direct view has been blocked and that external load port magazine 150 is empty. Of course, the light source and optical sensor should be arranged such that their direct view can be blocked only by platform 364, and not by any digital data storage devices 104 disposed on platform 364.

In a further embodiment, empty indicator 370 can be a mechanical switch which is switched by platform 364 to prevent further access by robotic picker 112 to space 356 of external load port magazine 150. For example, the switch may close a door (not shown) of opening 358. Other arrangements are, however, not excluded.

Similar to empty indicator 370, a full indicator 372 (FIG. 3D) is also provided to notify library 100 and/or the operator that external load port magazine 150 is full. Full indicator 372 can be configured similar to or different from empty indicator 370 or in any suitable manner.

In an alternative embodiment to that of FIGS. 3A-3D, a gravity-loaded external load port magazine is provided. Such gravity-loaded external load port magazine is similar to external load port magazine 150 in the upside-down state. Spring 362 may be omitted in this embodiment as digital data storage devices 104 automatically fall under gravity to the "bottom" 366 of the external load port magazine to be removed by robotic picker 112. A digital data storage device can be inserted in the gravity-loaded external load port magazine by a process similar to FIGS. 3C and 3A.

Figure 4:
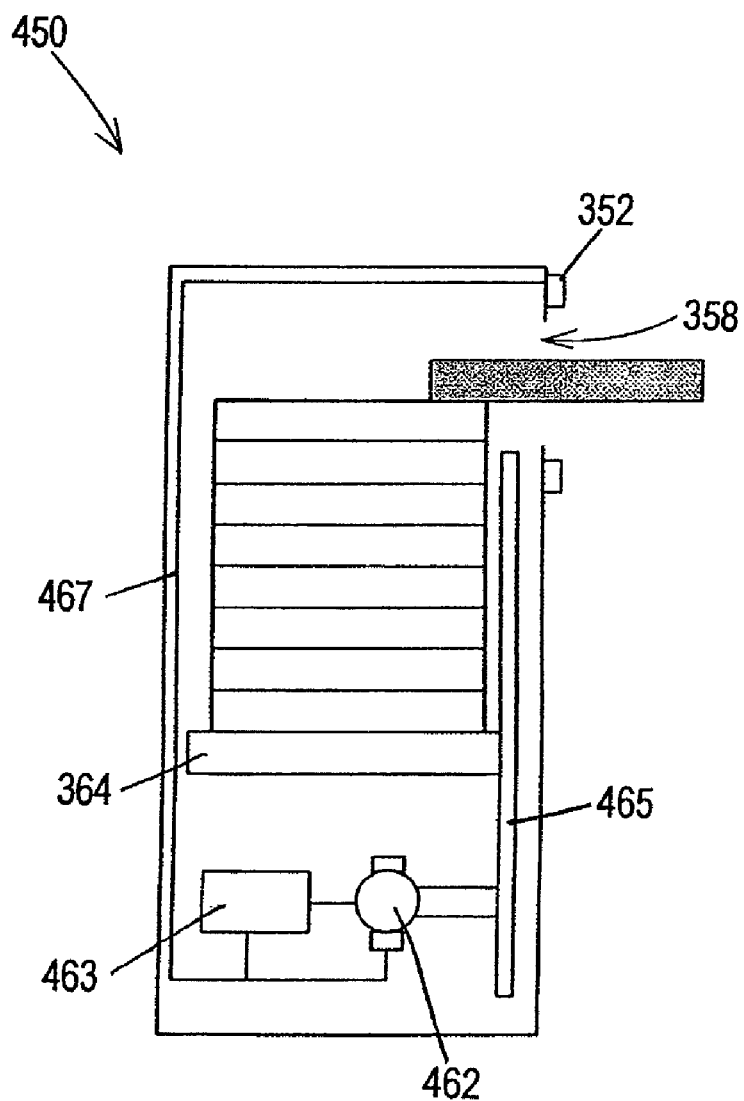
FIG. 4 is a schematic, cut-away side view of an external load port magazine in accordance with another embodiment.

FIG. 4 illustrates an external load port magazine 450 in accordance with another exemplary embodiment. External load port magazine 450 is basically similar to external load port magazine 150 of FIGS. 3A-3D, except for the following. Most significantly, external load port magazine 450 uses a motor 462, rather than spring 362, for moving the stored digital data storage devices 104 either towards or away from opening 358. In particular, platform 364 in external load port magazine 450 is moveable along a track 465 and is driven by motor 462 to go up and down depending on the unloading or loading action of robotic picker 112. A control 463 can be provided to control motor 462. In an embodiment, control 463 is omitted and motor 462 is directly controlled by library 100 via communication link 467 which can be wired or wireless.

In the former case, communication link 467 can be connected to a contact or contacts provided on one of connectors 352, at a portion where such contact or contacts are contactable with corresponding contacts of library 100 when external load port magazine 450 is detachably mounted on housing 102 of library 100. In the latter case, control 463 and/or motor 462 can be optically or RF controlled by library 100 or robotic picker 112. In either case, motor 462 is controlled to move platform 364 and hence the stack of digital data storage devices 104 supported thereon one step down every time robotic picker 112 or library 100 indicates that a loading operation is in process or that robotic picker 112 is going to place another digital data storage device in external load port magazine 450. Similarly, motor 462 is controlled to move platform 364 one step up after robotic picker 112 has removed a digital data storage device from external load port magazine 450. The position of platform 364 can be determined by empty and/or full indicators such as 370 and 372 described with reference to FIG. 3D, but can also be determined by control 463, library 100 or motor 462 itself based on the numbers of step-ups and/or step-downs made by platform 364.

In a further embodiment (not shown), motor 462 or an equivalent driving mechanism is placed inside library 100 and is arranged to transmit driving power to move platform 364 up and down along track 465. The power transmission can be done in any suitable manner, e.g., by pulleys, belts, gear wheels, pinion racks etc.

Figure 5A:
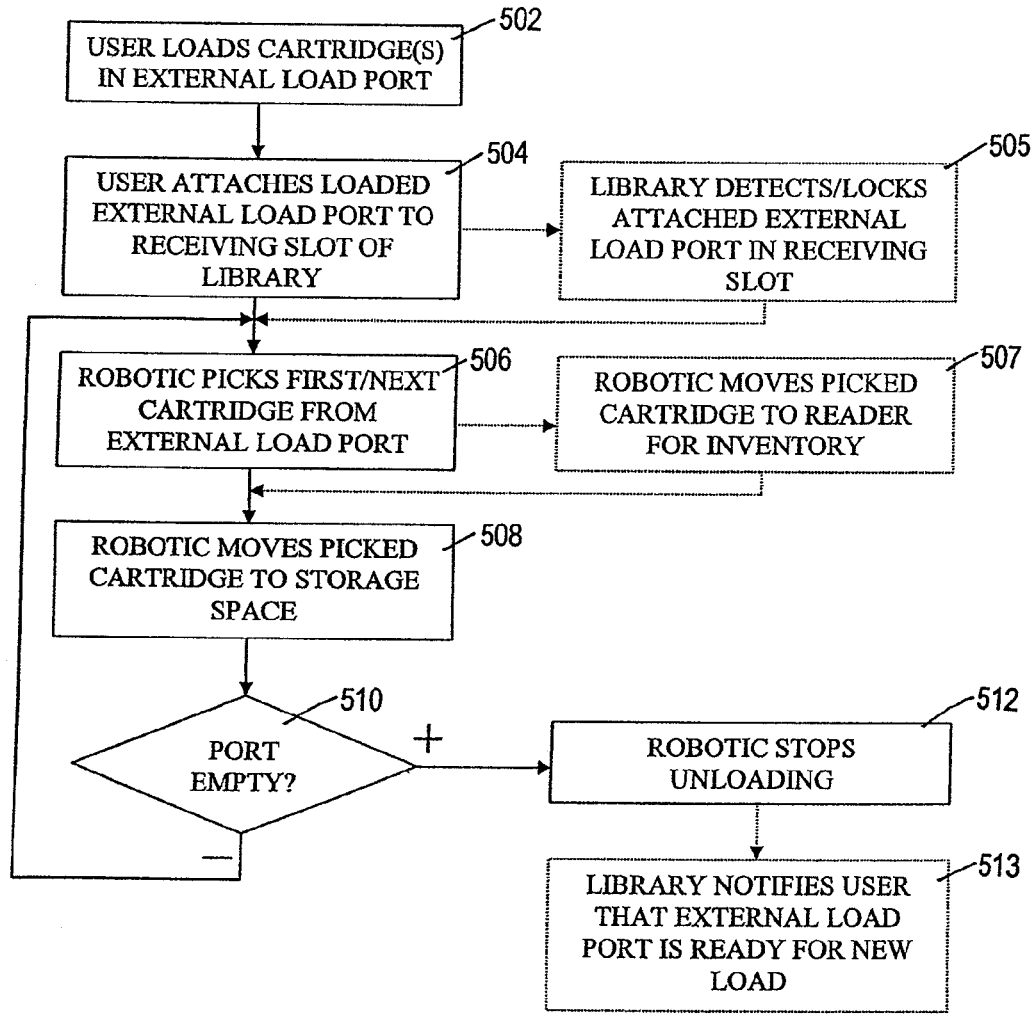
FIGS. 5A-5B are flow charts showing loading and unloading processes in accordance with further embodiments.
Figure 5B:
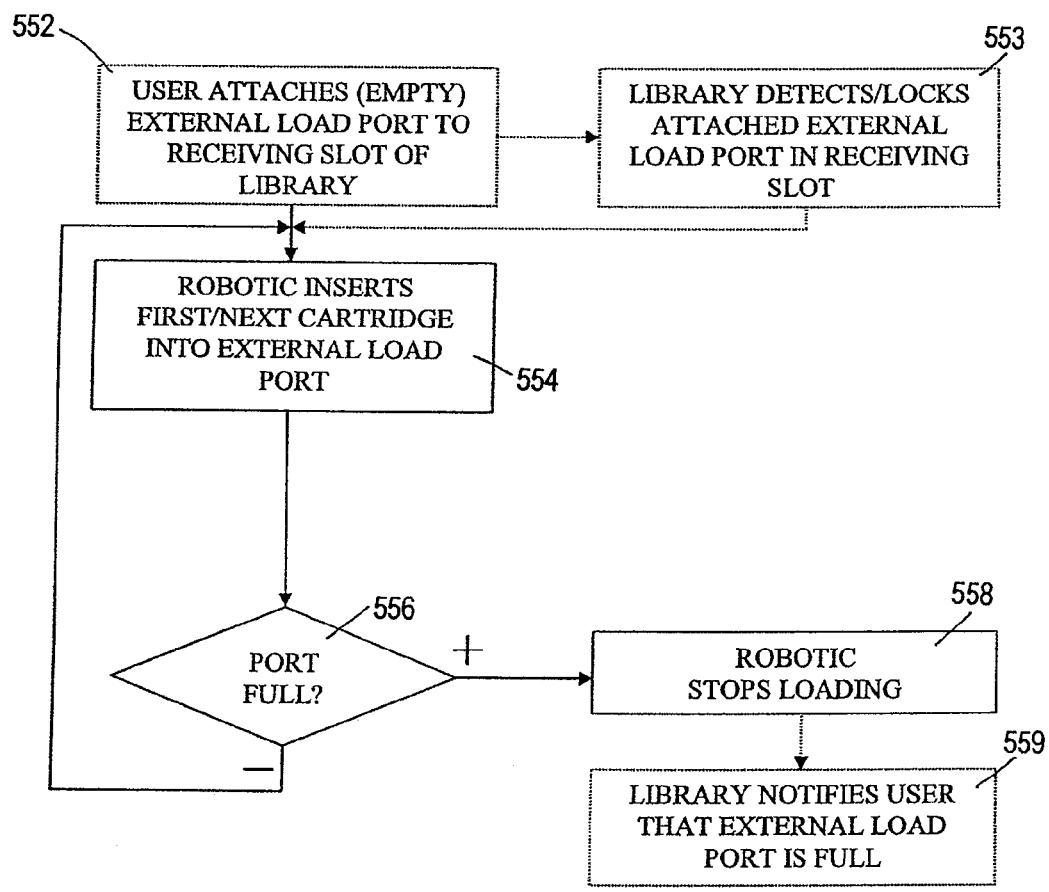

FIGS. 5A and 5B are flow charts showing exemplary loading and unloading processes using the disclosed external load port magazines. The physical positions of the external load port magazines and components of library 100 are schematically illustrated in FIGS. 1 and 2.

In the process of loading digital data storage devices into library 100, the user first loads digital data storage devices 104, e.g., in space 356 of external load port magazine 150, as shown at step 502 in FIG. 5A. Opening 358 can be used for manual loading of external load port magazine 150. However, one of the wall of casing 354 of external load port magazine 150, for example back wall 392 (FIG. 3A), or a larger opening on that wall can be opened to allow the user to load several digital data storage devices 104 in external load port magazine 150 at a time. The back wall 392 can be opened or another opening such as 193 in FIGS. 1, 2 can be provided to allow the operator to add one or more digital data storage devices to the external load port magazine 150 being attached to library 100 without detaching external load port magazine 150.

The user next attaches, at step 504 in FIG. 5A, the loaded external load port magazine 150 to housing 102 so that opening 358 is aligned with one of receiving slots 152 (FIG. 1) of library 100. The user then instructs library 100, e.g., via user interface 116, to unload digital data storage devices 104 from the attached external load port magazine 150. Alternatively, library 100 may be configured to automatically detect the presence of the attached external load port magazine 150 and to automatically initiate the unloading of external load port magazine 150, as shown at step 505 in FIG. 5A. The detection of external load port magazine 150 at one of receiving slots 152 can be arranged using sensors or switches as discussed with respect to empty indicator 370. Additionally or alternatively, other technologies such as bar codes or smart cards can be used. In an embodiment, library 100 locks external load port magazine 150 to its housing 102 to prevent undesired detachment of external load port magazine 150 during the unloading thereof.

In response to initiation of the unloading process, either manually by the user or automatically by library 100, robotic picker 112 approaches receiving slot 152 where external load port magazine 150 is positioned, as shown at K in FIG. 2. Robotic picker 112 extends, e.g., its fingers, in to space 356 of external load port magazine 150 through receiving slot 152 and opening 358, grips one of digital data storage devices 104 (in the embodiment of FIG. 3A, the uppermost digital data storage device 104U), and withdraws the gripped digital data storage device 104 out of external load port magazine 150. This step is indicated at 506 in FIG. 5A.

Robotic picker 112 then transfers the gripped digital data storage device 104 to one of the slots 106 within library 100 as shown at M in FIG. 2 and indicated at step 508 in FIG. 5A. In a further embodiment, robotic picker 112 first transfers the gripped digital data storage device 104 to reader/writer 110 as illustrated at L in FIG. 2, so that the content of the gripped digital data storage device 104 can be read and/or cataloged and/or updated and/or added by library 100, as designated at step 507 in FIG. 5A. Thereafter, robotic picker 112 removes the read/updated digital data storage device 104 from reader/writer 110 and moves it to the designated storage slot illustrated at M in FIG. 2.

Subsequently, if external load port magazine 150 does not indicate or is not determined by library 100 to be empty (step 510 in FIG. 5A), the steps 506, 508 or 506-508 will be repeated until external load port magazine 150 is empty or until the operator of library 100 interrupts the process, as indicated at step 512 in FIG. 5A. In an embodiment, library 100 or external load port magazine 150 will notify the operator, at step 513, by audible or visible signals, that external load port magazine 150 is empty and ready for a new load.

In the process of unloading digital data storage devices from library 100 as shown in FIG. 5B, the user first attaches, at step 552, an external load port magazine 150, for example an empty external load port magazine, to one of the receiving slots 152 of library 100 if no external load port magazine is currently attached to library 100 or if no attached external load port magazine is currently available for unloading.

Robotic picker 112 then removes a designated digital data storage device from its storage slot in accordance with instructions of library 100, as illustrated at N in FIG. 2. Since reader/writer 110 already knows the content of the removed digital data storage device 104, the digital data storage device need not be transferred to reader/writer 110. However, it is not excluded that some data need to be added to or erased from the digital data storage device, in which case robotic picker 112 will first transfer the digital data storage device to reader/writer 110.

In the next step 554 in FIG. 5B, robotic picker 112 inserts the digital data storage device into external load port magazine 150 through receiving slot 152 and opening 358. If external load port magazine 150 does not indicate or is not determined by library 100 to be full (step 556 in FIG. 5B), the above steps simplified at 554 in FIG. 5B will be repeated until external load port magazine 150 is full or until the operator of library 100 interrupts the process, as indicated at step 558 in FIG. 5B. In an embodiment, library 100 or external load port magazine 150 will notify the operator, at step 559, by audible or visible signals, that external load port magazine 150 is full or contains all digital data storage devices required to be removed from library 100, and can now be detached from library 100.

In an embodiment of the method of the present invention, the external load port magazine needs to be discovered upon power up and initialization of library 100 to let the library know to add the external load port magazine to its element list. An inventory of the external load port magazine would not be needed, nor possible, since only the first digital data storage device (e.g., 104U) in the external load port magazine is accessible to robotic picker 112.

It should be noted that in accordance with the present invention, receiving slots 152 need not be provided on the front of library 100, they can be arranged any where on the outer walls of library 100, for example, the side walls. Likewise, receiving slots 152 and/or openings 358 need not be horizontal as depicted in the drawings and can have any shape that allows passage of digital data storage devices therethrough. For example, receiving slots 152 and/or openings 358 can be vertical or slanted. Digital data storage devices can therefore be arranged within the external load port magazine in any manner suitable for their removal through the receiving slots 152 and openings 358, and need not be placed horizontally as illustrated. For example, digital data storage devices can be placed vertically or obliquely inside the external load port magazine. As a result, the direction in which digital data storage devices are moved towards and/or away from opening 358 can be varied depending on the nature of mechanism 360 and/or orientations of receiving slots 152, openings 358 and the digital data storage devices themselves.

Embodiments of the present invention further include one or more of the following features.

The disclosed external load port magazine has only a single opening, such as opening 358, through which robotic picker 112 can access, remove and insert digital data storage devices in the external load port magazine. In an embodiment, robotic picker 112 can only remove or insert one digital data storage device at a time from or to the external load port magazine. This arrangement simplifies control of robotic picker 112, because robotic picker 112 has to move always to the same physical location, which requires only a single logical load port address and corresponds to receiving slot 152, to pick up the next digital data storage device from the external load port magazine. In contrast, to unload digital data storage devices from internal load port magazine 124, robotic picker 112 must move each time to a different load port slot 128 as shown at B in FIG. 2 to pick up the next digital data storage device.

The disclosed external load port magazine also saves storage space inside library 100. If an internal load port magazine, such as 124, is used, load port slots 128 cannot be immediately used as regular storage slots 106; the operator has to reconfigure, either physically or logically load port slot 128, before they can be used as regular storage slots 106. At any given time, the slots configured as load port slot 128 are a waste of storage space inside library 100. In contrast, if the disclosed external load port magazine is used, all that is required is a receiving slot 152 on the outer wall of the housing of library 100 and a small clearance (288 in FIG. 2) inside library 100 and near receiving slot 152 for robotic picker 112 to maneuver. The space below clearance 288 can be used as regular storage slots as schematically indicated by magazine 289 in FIG. 2. The load port slots in each internal load port magazine, if used together with the external load port magazines, can be minimized or converted to storage slots.

The disclosed external load port magazine further requires minimal changes to the pre-existing library configuration. Besides a slight rearrangement, if indeed necessary, of the storage space inside library 100 to provide clearances 288, library 100 only requires the provision of one or more receiving slots 152 on the outer wall thereof. This can be done by, e.g., replacing each front panel 161-164 of the preexisting housing 102 with a corresponding panel having a receiving slot 152 and, if necessary, connecting members for engagement with connectors 352 and/or contacts for connection to any sensors or switches inside the external load port magazine. The receiving slots can be arranged at one or more places with minimal disturbance to interior mechanics and real estate.

The disclosed external load port magazine adds greater flexibility to the library configuration. For example, the user can choose to use none or some or all of the built-in receiving slots 152 with external load port magazines for loading the unloading digital data storage devices to and from library 100, without having to reconfiguring hardware or software of the load port slots as it was the case with internal load port magazine 124. Simply attaching an external load port magazine to one of receiving slots 152 will trigger the library to recognize that receiving slot as a load port slot, whereas any unused receiving slots can be disabled, e.g., by software, or left idle without sacrificing excessive storage space within the library. The user's need for load port slots can be met simply by using more or less external load port magazines at the same time.

The disclosed external load port magazine reduces hardware and/or software costs generally associated with the provision of built-in internal load port magazines.

The disclosed external load port magazine simplifies bulk loading/unloading, as the customer would just have to attached one or more external load port magazine(s), and issue commands to load/unload digital data storage devices to/from the attached external load port magazine(s). When the external load port magazine is full or empty, they simply attach another external load port magazine and repeat the process.

While the present invention has been illustrated by the description of the embodiments thereof, and while the embodiments have been described in considerable detail, it is not the intention of the applicant to restrict or in any way limit the scope of the appended claims to such detail. For example, those of skill in the art will appreciate that embodiments of the present invention have application to all types of digital data storage devices including but not limited to optical disks, magnetic disks, memory devices and magnetic tape cartridges. Embodiments of the invention are also applicable to other items and their storage units regardless of how the items are to be stored within the storage units. The items are not restricted to digital data storage devices and can comprise items which do not themselves store data.

Additional advantages and modifications could be made herein without departing from the scope of the described embodiments as defined by the appended claims.

What is claimed is:

1. An external load port magazine for use with an automated library, said external load port magazine comprising:
   a casing detachably mountable on an exterior of the library and defining therein a single space for holding plural cartridges to be loaded into the library;
   an opening in said casing for enabling automatic transfer of at least one of the plural cartridges from said single space directly into said library while said casing is mounted on the exterior of the library; and
   a mechanism for moving the plural cartridges towards said opening.

2. The external load port magazine according to claim 1, wherein said opening is the only opening in the casing through which the at least one item is passable, one at a time, when said casing is mounted on the exterior of the storage unit.

3. The external load port magazine according to claim 1, wherein said opening is the only opening in the casing through which the at least one item is passable, one at a time.

4. The external load port magazine according to claim 1, further comprising, in said casing, another opening to enable manual loading or unloading of one or more of the plural cartridges into or out of said single space.

5. The external load port magazine according to claim 1, further comprising an indicator for indicating at least one of (i) an empty state and (ii) a full state of said external load port magazine.

6. The external load port magazine according to claim 5, wherein said indicator is machine-readable so that the empty state or the full state of said external load port magazine is recognizable by the library.

7. The external load port magazine according to claim 1, wherein said mechanism resides in the single space defined by the casing and comprises a platform moveable within said single space toward and away from said opening for supporting the plural cartridges directly thereon and for moving the supported plural cartridges toward or away from said opening depending on a loading or unloading mode of said external load port magazine.

8. The external load port magazine according to claim 7, further comprising an indicator cooperating with said platform for indicating at least one of (i) an empty state and (ii) a full state of said external load port magazine.

9. The external load port magazine according to claim 1, further comprising at least one attaching element for detachably mounting said casing on the exterior of the library;
    said at least one attaching element adjacent to said opening such that said opening faces and is aligned with a matching opening of the library to enable the direct transfer of the at least one of the plural cartridges from the single space into the library while said casing is mounted on the exterior of the library.

10. A storage system, comprising:
    an automated library for storing a plurality of data storage devices; and
    at least an external load port magazine to be mounted on an exterior of said library while transferring at least one data storage device between said library and said load port magazine;
    wherein said library comprises
        a housing having therein a plurality of locations each capable of receiving and storing one of the data storage devices, and
        at least a receiving slot extending through a wall of said housing;
    wherein said external load port magazine comprises
        a casing detachably mountable on the exterior of said housing and defining therein a single space for holding plural data storage devices; and
        an opening in said casing to be aligned with said receiving slot when said casing is mounted on the exterior of said housing for enabling automatic and direct transfer of the plural data storage devices, one at a time, from said single space, which is external to the housing during transfer of the plural data storage devices, into said housing and vice versa through the aligned opening and receiving slot.

11. The storage system according to claim 10, wherein
    the receiving slot extends through a front panel of said housing; and
    said opening in said casing to be aligned with and opposite from said receiving slot when said casing is mounted on the exterior of said housing.

12. The storage system according to claim 11, wherein said opening is the only opening in the casing through which the at least one digital data storage device is passable, one at a time, when said casing is mounted on said housing of said library.

13. The storage system according to claim 10, wherein said library further comprises a robotic picker for gripping one of the plural data storage devices and transferring the one of the plural data storage devices from said single space of said external load port magazine to one of the locations within said housing of said library, and vice versa.

14. The storage system according to claim 13, wherein said robotic picker is extendable through said receiving slot for transferring selected ones of the plural data storage devices between the single space of said external load port magazine and the library.

15. The storage system according to claim 11, further comprising an indicator for indicating at least one of (i) a presence of said external load port magazine at said receiving slot, (ii) an empty state and (iii) a full state of said external load port magazine.

16. The storage system according to claim 15, wherein said indicator is machine-readable by a controller of said library which is operable to start or stop the transfer of the plural data storage devices between said external load port magazine and library based on the indicator.

17. The storage system according to claim 11, further comprising matching attaching elements on said casing of said external load port magazine and said housing of said library for detachably mounting said external load port magazine on the exterior of said library with said opening of said external load port magazine being aligned with said receiving slot of said library.

18. The storage system according to claim 17, further comprising locking elements for releasably locking the mounted external load port magazine to the housing of said library during the transfer of at least one data storage device between said external load port magazine and library.

19. A method of bulk loading and unloading of digital data storage devices to and from a digital data storage device library having therein a plurality of storage locations each being capable of receiving and storing one of the digital data storage devices, the method comprising:
    detachably mounting an external load port magazine to an exterior of said library so that an opening of said external load port magazine is aligned with a corresponding receiving slot of said library to define a passage between an interior space of said external load port magazine and the storage locations within said library; and
    while the external load port magazine is mounted to the exterior of said library, automatically transferring one or more of the digital data storage devices, one at a time, through said passage.

20. The method according to claim 19, wherein said passage is configured so that only one digital data storage device can be transferred therethrough at a time.

21. A library for storing a plurality of cartridges, said library comprising:
    a housing having an internal space in which a plurality of locations each capable of receiving and storing one of the cartridges are arranged, said housing being configured for allowing at least an external load port magazine to be detachably mounted on an exterior thereof while said housing receives said cartridges from the externally-mounted load port magazine,
    at least a receiving slot extending through a wall of said housing and alignable with an opening of the external load port magazine when the external load port magazine is mounted on the exterior of the housing, the receiving slot to enable transfer of at least one cartridge between the externally mounted, external load port magazine and the internal space of the library, and a robotic picker for gripping and moving said at least one cartridge through said receiving slot for transferring said at least one cartridge between the internal space of the storage unit and the external load port magazine while the external load port magazine is mounted on the exterior of the library.

22. The storage unit according to claim 21, wherein said robotic picker is extendable through said receiving slot for transferring said cartridges, one at a time, between the externally mounted, external load port magazine and the internal space of the storage unit.

23. The external load port magazine according to claim 1, wherein said single space is not retracted into said library when said at least one of the plural cartridges is being transferred from the single space directly into the library.

24. The external load port magazine according to claim 23, wherein said mechanism resides inside said single space and comprises a spring-loaded platform for supporting the plural cartridges thereon, said platform moveable within said single space by a spring for biasing the platform toward or away from said opening.

25. The external load port magazine according to claim 24 wherein the plural cartridges are to be stacked, one directly on top of the other, on the spring-loaded platform.

* * * * *